Patented Apr. 25, 1950

2,504,980

UNITED STATES PATENT OFFICE 2,504,980

ETHERS OF 7-HYDROXYPHENOTHIAZONE-3

David F. Houston, El Cerrito, and Ernest B. Kester, Berkeley, Calif., assignors to the United States of America as represented by the Secretary of Agriculture No Drawing. Application August 23, 1949,
Serial No. 111,963

7 Claims. (Cl. 260—243)

(Granted under the act of March 3, 1883, as
amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This application relates to alkyl ethers of 7-hydroxyphenothiazone-3 wherein the alkyl radical contains at least 5 carbon atoms. These compounds can be represented by the formula

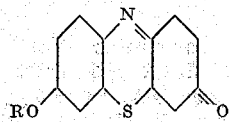

wherein R is an alkyl radical containing at least 5 carbon atoms.

The alkyl ethers in accordance with this invention are red or orange-red crystalline solids which are useful as dyestuffs, pigments, and as intermediates for the preparation of other dyestuffs. They are water-insoluble but are soluble in fat solvents and other lipophilic materials, thus they may be used as coloring agents for gasoline, lubricating oils, greases, plastics, etc. Further, these alkyl ethers have bacteriostatic properties, for example, against *Mycobacterium tuberculosis* (in vitro).

The objects of this invention include: the provision of novel compounds, namely alkyl ethers of 7-hydroxyphenothiazone-3 and also the provision of methods for preparing and purifying these compounds. Further objects will be apparent from the description herein.

The novel ethers of this invention are prepared by reacting the silver salt of 7-hydroxyphenothiazone-3 with an alkyl iodide. The particular alkyl iodide determines the type of ether produced, thus if n-amyl iodide is used, the n-amyl ether is produced. Other alkyl iodides which may be used are hexyl iodide, heptyl iodide, octyl iodide, nonyl iodide, decyl iodide, undecyl iodide, dodecyl iodide, tridecyl iodide, tetradecyl iodide, pentadecyl iodide, hexadecyl iodide, heptadecyl iodide, octadecyl iodide, and so forth. The alkyl radical need not be a straight-chain (normal) radical but may be branched so that one can also use 3-methyl pentyl iodide, isoamyl iodide, 2-ethyl hexyl iodide, and so forth. The alkyl iodide reagent is generally employed in excess whereby the reaction proceeds faster; the unreacted alkyl iodide can be recovered from the reaction mixture by suitable techniques such as distillation. The etherification is carried out at an elevated temperature from about 50° C. to 200° C. It is preferred to carry out the etherification in a solvent and reflux the solvent during the reaction. Suitable solvents are benzene, toluene, xylenes, or other inert, organic, hydrophobic solvents. After the etherification is complete the product can be recovered by filtration and evaporation of the solvent and by vacuum distillation to remove the excess alkyl iodide. If, however, the product is desired in pure form then it is preferred to carry out an adsorption and elution. To this end, the filtered reaction mixture is contacted with a solid adsorbent material such as alumina, activated carbon, bentonite, or the like. The ether is adsorbed on the surface of the adsorbent by this treatment. The adsorbent material is then washed with a solvent and by observing the color of the wash solvent the product may be separated. Thus only the solvent effluents are collected which are red in color, since those contain the desired ether. The other fractions are discarded since they contain the impurities. The red solvent fractions are then subjected to evaporation to recover the ether in solid form. For the purpose of eluting the adsorbent one can use benzene, chloroform, mixtures of benzene and chloroform, toluene, xylene, carbon tetrachloride, ethylene dichloride or other inert, organic hydrophobic solvent.

The following examples demonstrate specific techniques within the scope of this invention. It is understood that these examples are furnished only by way of illustration and not limitation.

EXAMPLE I (a) *Preparation of silver salt of
7-hydroxyphenothiazone-3*

2.35 grams (0.01 mole) of the lithium salt of 7-hydroxyphenothiazone-3 was dissolved in one liter of hot water. 2.5 grams (0.015 mole) of silver nitrate, dissolved in 100 ml. of water was added and the reaction mixture digested on the steam bath for one hour. The silver salt was then separated by filtration, washed, and dried at 105° C.

(b) *Preparation of 7-n-amyloxy-
phenothiazone-3*

The silver salt as obtained in step *a* was dispersed in 500 ml. of benzene together with 9.9 grams (.05 mole) of n-amyl iodide. The mixture was refluxed for 7 hours then filtered, the filtrate being retained. The solid material remaining on the filter was washed with 200 cc. of hot benzene, the wash liquid being added to the first filtrate. iodide, and n-hexadecyl iodide, respectively. The following results were obtained.

*Ethers of 7-hydroxyphenothiazone-3*

| Alkyl group of ether | Color | Yield, Percent | Melting point, °C. | Analytical data | | | Calc. data | | |
|---|---|---|---|---|---|---|---|---|---|
| | | | | C, Percent | H, Percent | N, Percent | C, Percent | H, Percent | N, Percent |
| n-octyl | garnet red | 53 | 115.5–116 | 70.8 | 6.88 | 4.02 | 70.33 | 6.79 | 4.1 |
| n-dodecyl | do | 52 | 121 –122.5 | 72.9 | 7.88 | 3.47 | 72.5 | 7.86 | 3.52 |
| n-hexadecyl | orange red | 44 | 120.5–121.5 | 74.0 | 8.65 | 3.04 | 74.13 | 8.66 | 3.09 |

The combined liquid phases contained a yield of 40% of the crude 7-n-amyloxyphenothiazone-3.

(c) *Purification*

The benzene solution from part *b* was poured through a cylinder 15 cm. long and 3.3 cm. in diameter, which was filled with granules of activated alumina. The amyl ether was adsorbed on the alumina by this treatment in a broad red band. A series of solvents, namely, 250 ml. benzene, 1000 ml. benzene-chloroform (9:1), and 2500 ml. benzene-chloroform (4:1), were passed through the cylinder to move the red band of the amyl ether through the alumina and finally wash it out. In these washings only those portions of the solvents which were colored red were retained. Some of the impurities originally present were dissolved in the discarded portions of the solvent and unetherified 7-hydroxyphenothiazone-3 and some dark impurities remained strongly adsorbed at the top of the column. The portion of the solvent liquid containing the amyl ether was evaporated and the solid material was recrystallized from hexane-benzene and acetone. A yield of 25% of 7-amyloxyphenothiazone-3 was obtained as garnet-red, lathlike crystals—M. P. 124.5–126° C. Analysis: C, 68.2%; H, 5.63%; N, 4.66% (calculated: C, 68.20%; H, 5.75%; N, 4.68%).

EXAMPLE II

The process of Example I was repeated, substituting for n-amyl iodide stoichiometrically equivalent amounts of n-octyl iodide, n-dodecyl

Having thus described the invention, what is claimed is:

1. An alkyl ether of 7-hydroxyphenothiazone-3 wherein the alkyl radical contains at least 5 carbon atoms.
2. 7-amyloxyphenothiazone-3.
3. 7-octyloxyphenothiazone-3.
4. 7-hexadecyloxyphenothiazone-3.
5. A process for preparing a 7-alkoxyphenothiazone-3 which comprises reacting the silver salt of 7-hydroxyphenothiazone-3 with an alkyl iodide containing at least 5 carbon atoms.
6. A process for isolating an alkyl ether of 7-hydroxyphenothiazone-3 from an impure solution thereof which comprises contacting the solution with a solid adsorbent material, washing the treated adsorbent material with an organic, hydrophobic solvent and collecting the fraction of the solvent wash liquid which contains the alkyl ether.
7. A process for preparing an alkyl ether of 7-hydroxyphenothiazone-3 which comprises reacting the silver salt of 7-hydroxyphenothiazone-3 with an alkyl iodide in the presence of refluxing benzene, passing the resulting benzene solution of the alkyl ether through a bed of alumina, washing the bed with chloroform-benzene and collecting the fraction of the wash solvent which contains the alkyl ether.

DAVID F. HOUSTON.
ERNEST B. KESTER.

No references cited.